US012670594B2

(12) United States Patent
Wiemker et al.

(10) Patent No.: US 12,670,594 B2
(45) Date of Patent: Jun. 30, 2026

(54) SYSTEM AND METHOD FOR EVALUATING A PULMONARY VENTILATION AND PERFUSION GRADIENT

(71) Applicant: KONINKLIJKE PHILIPS N.V., Eindhoven (NL)

(72) Inventors: Rafael Wiemker, Kisdorf (NL); Jörg Sabczynski, Norderstedt (NL); Cornelis Petrus Hendriks, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 185 days.

(21) Appl. No.: 18/702,143

(22) PCT Filed: Oct. 12, 2022

(86) PCT No.: PCT/EP2022/078380
§ 371 (c)(1),
(2) Date: Apr. 17, 2024

(87) PCT Pub. No.: WO2023/066752
PCT Pub. Date: Apr. 27, 2023

(65) Prior Publication Data
US 2024/0412357 A1 Dec. 12, 2024

(30) Foreign Application Priority Data
Oct. 18, 2021 (EP) ..................................... 21203150

(51) Int. Cl.
G06K 9/00 (2022.01)
G06T 7/00 (2017.01)
G06T 7/11 (2017.01)

(52) U.S. Cl.
CPC .............. *G06T 7/0012* (2013.01); *G06T 7/11* (2017.01); *G06T 2207/10081* (2013.01); *G06T 2207/30061* (2013.01)

(58) Field of Classification Search
CPC ..................... G06T 7/0012; G06T 7/11; G06T 2207/10081; G06T 2207/30061;
(Continued)

(56) References Cited

U.S. PATENT DOCUMENTS

| | | | |
|---|---|---|---|
| 9,031,632 B2 | 5/2015 | Olszewski | |
| 2008/0194980 A1 | 8/2008 | Gigolf | |

(Continued)

FOREIGN PATENT DOCUMENTS

| | | |
|---|---|---|
| JP | 2017077322 A | 4/2017 |
| WO | WO2020231904 A1 | 11/2020 |

OTHER PUBLICATIONS

PCT International Search Report, International application No. PCT/EP2022/078380, Feb. 7, 2023.
(Continued)

*Primary Examiner* — Avinash Yentrapati
(74) *Attorney, Agent, or Firm* — Larry Liberchuk

(57) ABSTRACT

A system and method for quantifying a pulmonary ventilation and perfusion gradient of a lung of a subject. Local Hounsfield density histograms are generated from computed tomography imaging data and each local histogram is cross-correlated with a global Hounsfield density histogram at a plurality of different shift values. A final shift value is determined for each local histogram based on the correlation values obtained by the cross-correlation.

13 Claims, 3 Drawing Sheets

(58) Field of Classification Search
CPC . G06T 2207/30012; G06T 2207/30016; G06T
2207/30021; G06T 2207/30024; G06T
2207/30028; G06T 2207/30032; G06T
2207/30036; G06T 2207/30041; G06T
2207/30044; G06T 2207/30048; G06T
2207/30052; G06T 2207/30056; G06T
2207/30064; G06T 2207/30068; G06T
2207/30072; G06T 2207/30076; G06T
207/30081; G06T 2207/30084; G06T
2207/30088; G06T 2207/30092; G06T
2207/30096; G06T 2207/30101; G06T
2207/30104
See application file for complete search history.

(56) References Cited

U.S. PATENT DOCUMENTS

| | | | | |
|---|---|---|---|---|
| 2008/0205717 A1* | 8/2008 | Reeves | ..................... | G06T 5/77 |
| | | | | 382/128 |
| 2021/0065361 A1* | 3/2021 | Wiemker | .................. | G06T 7/70 |

OTHER PUBLICATIONS

Mulreany D. G. et al., "Volumetric Xenon-CT Imaging of Conventional and High-frequency Oscillatory Ventilation I", Academic Radiology, Elsevier, Amsterdam, NL, vol. 16, No. 6, Jun. 1, 2009, pp. 718-725, XP026419454.

Kircher M. et al., "Regional Lung Perfusion Analysis in Experimental ARDS by Electrical Impedance and Computed Tomography", IEEE Transactions on Medical Imaging, IEEE, USA, vol. 40, No. 1, Sep. 21, 2020, pp. 251-261, XP011828192.

Gunnar E. et al., "Quantification of Ventilation Distribution in Regional Lung Injury by Electrical Impedance Tomography and Xenon Computed Tomography", Physiological Measurement, Institute of Physics Publishing, Bristol, GB, vol. 34, No. 10, Sep. 11, 2013, pp. 1303-1318, XP020251547.

Wu Y. et al., "An image-clustering method based on cross-correlation of color histograms", Proceedings SPIE 5682, Storage and Retrieval Methods and Applications for Multimedia 2005, Jan. 2005.

Guthier B. et al., "Parallel Implementation of a Real-Time High Dynamic Range Video System", Integrated Computer-Aided Engineering, vol. 21, issue 2, pp. 189-202, 2014.

Wildberger J.E. et al., "Multi-Slice CT for Visualization of Pulmonary Embolism using Perfusion Weighted Color Maps", Fortschr Rontgenstr, Rofo. Apr. 2001; 173(4):289-94.

Hansell D. M. et al., "Thin-Section CT of the Lungs: The Hinterland of Normal", Radiology, vol. 256, No. 3, pp. 695-711, Sep. 2010.

Fromson B.H. et al., "Quantitative Features in the Computed Tomography of Healthy Lungs", Thorax, vol. 43, pp. 120-126, 1988.

Hopkins S.R. et al., "Vertical Gradients in Regional Lung Density and Perfusion in the Supine Human Lung: The Slinky Effect", Journal of Applied Physiology, vol. 103, pp. 240-248, 2007.

* cited by examiner

210

220

230

240

300

Receive CT imaging data — 310

Perform segmentation — 320

Generate local histograms — 330

Generate global histogram — 340

Generate shifted local histograms — 350

Cross-correlate histograms — 360

Produce final shift value — 370

SYSTEM AND METHOD FOR EVALUATING A PULMONARY VENTILATION AND PERFUSION GRADIENT

FIELD OF THE INVENTION

The invention relates to the field of evaluating computed tomography (CT) images.

BACKGROUND OF THE INVENTION

Gravity can cause a pulmonary ventilation and perfusion gradient between ventral and dorsal regions of the lungs, especially in the lungs of a subject who has been lying down for a long period.

The potential adverse effects caused by this gradient should be taken into account when treating patients with acute respiratory syndrome (ARDS), which is often caused by infectious pulmonary diseases such as COVID-19, by, for example, applying mechanical ventilation while the patient is in a prone position in addition to the standard supine position.

However, the presence and magnitude of a gravity-caused gradient can vary widely between patients. Some diseases increase or decrease the magnitude of this gradient: for example, patients with systemic sclerosis-related vasculopathy show a reduced gravity-dependent attenuation effect, due to the reduced elastic compliance of the pulmonary arterial tree. Several diffuse lung diseases (e.g. hypersensitivity pneumosis, cellular non-specific interstitial pneumonia, and subacute diffuse alveolar damage) show a subtle, relatively homogenous increase in lung attenuation, which may overlap with the gravity-induced gradient.

The pulmonary ventilation and perfusion gradient in a patient is visible, in three-dimensional images from a CT chest scan, as a subtle shift in overall Hounsfield densities between ventral and dorsal lung regions (with dorsal regions having higher Hounsfield densities when a subject is in a supine position). However, the effect is difficult to quantify objectively.

Further, the pulmonary parenchyma surrounds regular anatomical structures (such as vessels, bronchi, lymph nodes and the heart). In patients with pulmonary diseases, disease lesions, effusions, atelectasis, mesothelioma and scars may be embedded in the pulmonary parenchyma. This "anatomical noise" means that there are far greater variations in Hounsfield density in a CT image of the lungs than the variation caused by the pulmonary ventilation and perfusion gradient. Simple quantitative measures, such as regional average Hounsfield density, cannot therefore be used to provide information about the ventro-dorsal gravity effect.

Treatment decisions for patients with acute respiratory syndrome often need to be made urgently in an emergency situation, in which there is not sufficient time to take careful manual measurements to determine information about the pulmonary ventilation and perfusion gradient.

There is therefore a need for improved information about the pulmonary ventilation and perfusion gradient between ventral and dorsal regions of a subject's lungs.

US 2021/065361 A1 discloses a method and system for determining regions of hyperdense lung parenchyma in an image of a lung.

WO 2020/231904 A1 discloses a method for imaging a lung of a patient.

Mulreany, D G et al., "Volumetric xenon-CT imaging of conventional and high-frequency oscillatory ventilation", Academic Radiology, 16(6):718-725, 1 Jun. 2009 discloses obtaining high-resolution volumetric ventilation maps of a lung.

Kircher, Michael et al., "Regional lung perfusion analysis in experimental ARDS by electrical impedance and computed tomography", IEEE Transactions on Medical Imaging, 40(1):251-261, 21 Sep. 2020 discloses a method for detecting pulmonary diffusion based on indicator-enhanced electrical impedance tomography.

Gunnar, Elke et al., "Quantification of ventilation distribution in regional lung injury by electrical impedance tomography and xenon computed tomography", Physiological Measurement, 34(10):1303-1318, 11 Sep. 2013 discloses an electrical impedance tomography based assessment of regional ventilation under pathological conditions.

SUMMARY OF THE INVENTION

The invention is defined by the claims.

According to examples in accordance with an aspect of the invention, there is provided a processing system for evaluating a pulmonary ventilation and perfusion gradient of at least one lung of a subject.

The processing system is configured to: receive CT imaging data containing a representation of at least one lung of the subject; perform segmentation on the CT imaging data to identify the representation of at least one lung of the subject; generate a plurality of local histograms of Hounsfield density frequency distribution by processing the CT imaging data, wherein each of the plurality of local histograms is representative of a different region of the at least one lung represented in the CT imaging data; generate a global histogram of Hounsfield density frequency distribution for the at least one lung of the subject; and, for each of the plurality of local histograms: generate a plurality of shifted local histograms, each shifted local histogram being a version of the local histogram shifted by different shift value; cross-correlate each shifted local histogram with the global histogram to produce a respective plurality of correlation values; and process the shift values and the correlation values to produce a final shift value, wherein an overall range in magnitudes of the final shift values is representative of a magnitude of the pulmonary ventilation and perfusion gradient.

The inventors have recognized that a pulmonary ventilation and perfusion gradient may be quantified by shift values in Hounsfield units from cross-correlating local histograms. A local histogram in a region having a higher density will typically have a higher correlation with a global histogram for shifts in a first direction (i.e. positive shift values), while a local histogram in a region having a lower density will generally have a higher correlation with a global histogram for shifts in a second direction, opposite to the first direction (i.e. negative shift values).

The overall range in magnitudes of the final shift values is representative of the magnitude of the pulmonary ventilation and perfusion gradient, while the direction in which the range in magnitudes of the final shift values is greatest is representative of the direction of the gradient. A difference in magnitude between final shift values of neighboring regions is representative of a local gradient between those regions.

The CT imaging data may be two-dimensional or three-dimensional imaging data. Three-dimensional imaging data may provide improved accuracy and statistical power over two-dimensional imaging data.

In some examples, the final shift value for each of the plurality of local histograms is the shift value corresponding to the correlation value having the maximum value amongst the plurality of correlation values of the local histogram.

The shift value corresponding to maximum histogram cross-correlation (i.e. the shift value at which a correlation value is highest) may be considered to best represent a difference between a local histogram and the global histogram.

In some examples, the final shift value for each of the plurality of local histograms is a correlation-weighted mean shift value.

The use of correlation-weighted mean shift values as the final shift values increases robustness against noise and outliers.

In some examples, the processing system is further configured to provide, at a user interface, a visualization of the final shift values.

A visualization of the shift values allows a clinician to immediately see the presence, amount and distribution of the pulmonary ventilation and perfusion gradient, enabling them to take this into account during treatment.

The visualization also allows a clinician to detect the presence of attenuation differences caused by disease rather than gravity, as local attenuation gradients that are not aligned with the direction of gravity will be apparent in the visualization.

Negative final shift values may be represented by a first color, and positive final shift values may be represented by a second, different color.

The use of different colors for positive and negative shift values makes a direction of the gradient immediately apparent: it is the direction of the color change.

In some examples, the visualization of the final shift values is generated by: generating, for each local histogram, a visualization of the maximum correlation values for that local histogram; and generating an overlay representative of the final shift values on the visualization of the maximum correlation values.

This recognizes that the correlation values at which cross-correlation is highest also provide valuable clinical information. Typical parenchyma regions will have higher maximum correlation values than disease-affected areas, for which cross-correlation with the global histogram will yield low correlation values at any shift value. Disease-affected areas include lesions, effusions, atelectasis, mesothelioma etc.

By overlaying a representation of the final shift values on a visualization of maximum correlation values, a clinician may obtain all this information from a single image, allowing the clinician to make swift treatment decisions.

The visualization may use different effects to represent the final shift values and maximum correlation values. For example, a gray-valued visualization may be used to represent the maximum correlation values, with lighter shades representing higher maximum correlation values, and a color scale overlay may be used to represent the final shift values.

The shift values may be in a predetermined range, for instance, from between −200 Hounsfield units and +200 Hounsfield units.

The plurality of local histograms may comprise ray-wise histograms in a lateral direction and/or an axial, i.e. cranio-caudal, direction.

For a subject in a prone or supine position, the lateral and axial directions are perpendicular to the direction of gravity. The effect of gravity is therefore generally lowest in these directions. The systematic mutual shifts between different histograms in either the lateral or axial direction may therefore be used to quantify and visualize the gravity-dependent gradient.

In cases where results are presented as a sagittal overview image, ray-wise histograms in a lateral direction may be used as the plurality of local histograms for an improved visual resolution and smoothness.

Both ray-wise histograms in a lateral and ray-wise histograms in an axial direction may be used as the plurality of local histograms in order to evaluate the pulmonary ventilation and perfusion gradient in three dimensions. For example, a three-dimensional visualization of final shift values may be generated by cross-correlating ray-wise histograms in both directions with a global histogram.

The plurality of local histograms may comprise two-dimensional patch-wise histograms in a coronal plane.

For a subject in a prone or supine position, the coronal plane is perpendicular to the direction of gravity. Patch-wise histograms in the coronal plane may provide the most visually favorable results for results presented in a coronal view.

In some examples, each of the plurality of local histograms is generated by: generating a plurality of sub-local histograms, wherein each of the sub-local histograms is representative of a different sub-region of the region of the at least one lung corresponding to the local histogram; and cumulating the sub-local histograms into the local histogram.

Where the local histograms comprise a plurality of sub-local histograms, the sub-local histograms have a finer resolution than the local histograms. For example, the sub-local histograms may be ray-wise histograms (e.g. in a lateral and/or axial direction) or two-dimensional patch histograms (e.g. in a coronal plane).

By first generating histograms at a finer resolution than required (e.g. a finest possible resolution), then cumulating these histograms into histograms having a desired resolution, local histograms at a variety of resolutions may be generated efficiently as required by a user.

For example, if a user decides that a resolution of a visualization generated based on cross-correlating the local histograms does not provide sufficiently useful information, the user may provide user input requesting a visualization at a different resolution. In another example, a user may find a plurality of visualizations at different resolutions useful. These may be generated efficiently by cumulating the sub-local histograms into new local histograms according to the required resolution.

In some examples, the global histogram is generated by cumulating the local histograms into the global histogram.

There is also proposed a system for evaluating at least one lung of a subject. The system comprises: a CT scanner configured to produce CT imaging data; and the processing system described above, configured to receive the CT imaging data from the CT scanner.

The processing system may be configured to generate a visualization of the final shift values, and the system may further comprise a user interface, configured to receive, from the processing system, and display the generated visualization of the final shift values.

According to another aspect of the invention, there is provided a computer-implemented method for evaluating a pulmonary ventilation and perfusion gradient of at least one lung of a subject. The computer-implemented method comprises: receiving CT imaging data containing a representation of at least one lung of the subject; performing segmentation on the CT imaging data to identify the representation of at least one lung of the subject; generating a plurality of local histograms of Hounsfield density frequency distribution by processing the CT imaging data, wherein each of the plurality of local histograms is representative of a different region of the at least one lung represented in the CT imaging data; generating a global histogram of Hounsfield density frequency distribution for the at least one lung of the subject; and, for each of the plurality of local histograms: generating a plurality of shifted local histograms, each shifted local histogram being a version of the local histogram shifted by different shift value; cross-correlating each shifted local histogram with the global histogram to produce a respective plurality of correlation values; and processing the shift values and the correlation values to produce a final shift value, wherein an overall range in magnitudes of the final shift values is representative of a magnitude of the pulmonary ventilation and perfusion gradient.

There is also proposed a computer program product comprising computer program code means which, when executed on a computer device having a processing system, cause the processing system to perform all of the steps of the method described above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
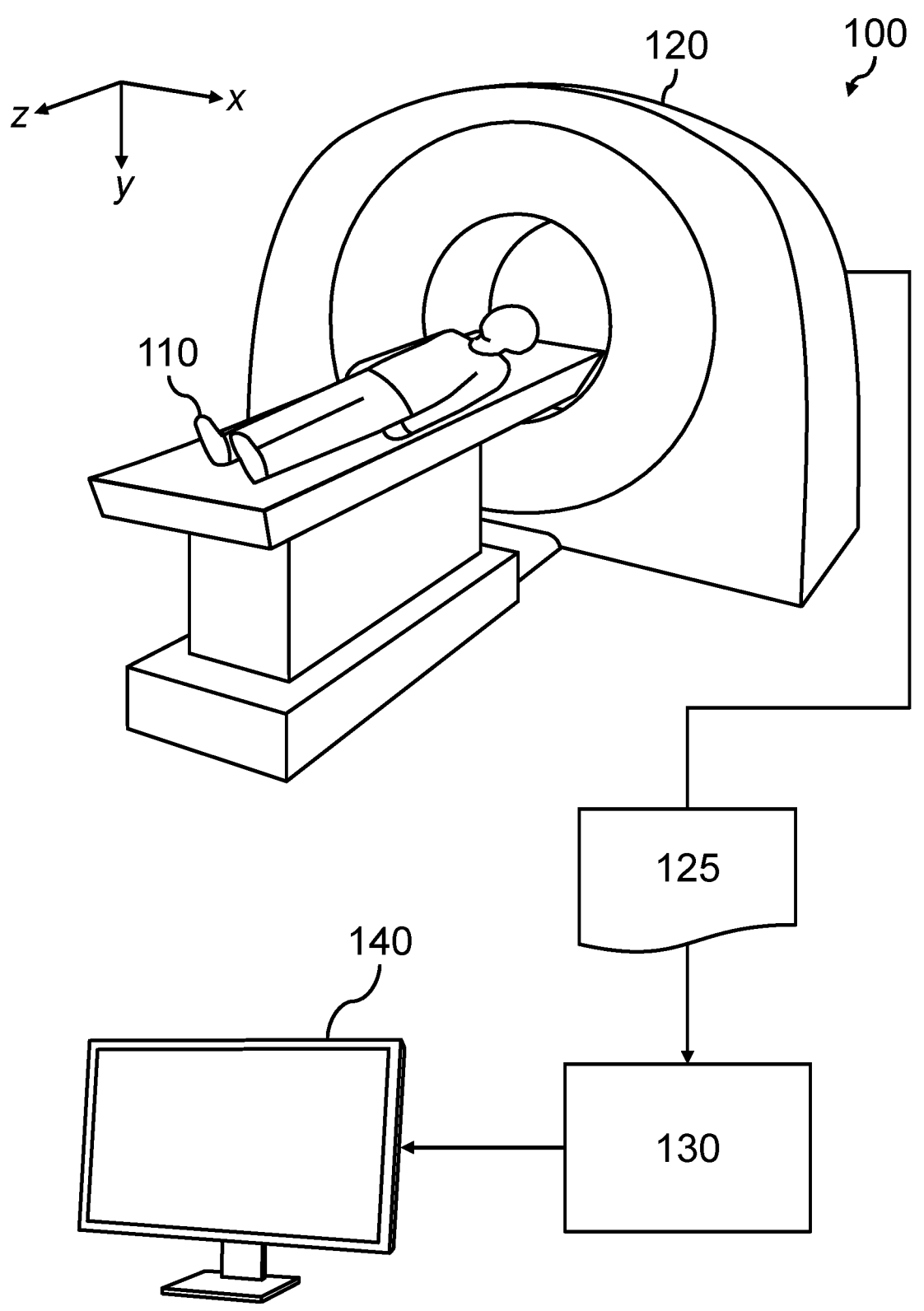
FIG. 1 illustrates a system for evaluating at least one lung of a subject, according to an embodiment of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the same reference numerals are used throughout the Figures to indicate the same or similar parts.

According to a concept of the invention, there is proposed a system and method for quantifying a pulmonary ventilation and perfusion gradient of a lung of a subject. Local Hounsfield density histograms are generated from computed tomography imaging data and each local histogram is cross-correlated with a global Hounsfield density histogram at a plurality of different shift values. A final shift value is determined for each local histogram based on the correlation values obtained by the cross-correlation.

Embodiments are at least partly based on the realization that a pulmonary ventilation and perfusion gradient may be represented by the Hounsfield unit shift values for which local histograms most closely correlate with a global histogram.

Illustrative embodiments may, for example, be employed in computed tomography systems, in particular in PACS- and Workstation reading modules (e.g. Philips Intellis-pace—Portal, -Pacs and Illumeno), and in intensive care and mechanical ventilation treatment.

FIG. 1 illustrates a system 100 for evaluating at least one lung of a subject 110, according to an embodiment of the invention. The system comprises a computed tomography (CT) scanner 120, a processing system 130, and, optionally, a user interface 140. The processing system 130 is, itself, an embodiment of the invention.

The CT scanner 120 may be any suitable CT scanner. A conventional CT scanner includes an x-ray radiation generator mounted on a rotatable gantry or on a C-arm opposite one or more integrating detectors. The x-ray generator rotates fully or partially around an examination region located between the x-ray generator and the one or more detectors and emits (typically polychromatic) radiation that traverses the examination region and a subject and/or object disposed in the examination region. The one or more detectors detect radiation that traverses the examination region and generate a signal (or projection data) indicative of the examination region and the subject and/or object disposed therein. The projection data refers to the raw detector data, and can be used to form a projection sinogram, the latter being a visual representation of the projection data captured by the detector(s).

A reconstructor is typically further used to process the projection data and reconstruct a volumetric image of the subject or object. The volumetric image is composed of a plurality of cross-sectional image slices which are each generated from the projection data through a process of tomographic reconstruction, such as through application of a filtered back projection algorithm. The reconstructed image data is effectively an inverse radon transform of the raw projection data.

The CT scanner 120 obtains/generates CT imaging data 125 containing a representation of at least one lung of the subject 110. The CT imaging data may be any imaging data from which a gravity-dependent pulmonary ventilation and perfusion gradient in the at least one lung may be evaluated. In some examples, the CT imaging data may be two-dimensional imaging data containing a component in the gravity direction. In the case of a subject in a supine or prone position, the direction of gravity is parallel or approximately parallel to an anteroposterior (y-) direction. The CT imaging data may therefore contain a two-dimensional lateral or axial slice through the subject's chest. In other examples, the CT imaging data may be three-dimensional (e.g. a whole chest scan).

The processing system 130 receives the CT imaging data 125 from the CT scanner 120, and performs segmentation on the CT imaging data to identify the representation of at least one lung of the subject 110. Any suitable segmentation method, such as voxel-based segmentation methods, mesh-model based, and AI-based segmentation methods (e.g. using one or more convolutional neural networks or other machine-learning methods), may be used to identify the representation of at least one lung. The segmentation may include the separation/identification of the (bounds of the) subject's left lung, right lung or both lungs.

The processing system 130 processes the CT imaging data 125 to generate a plurality of local histograms of Hounsfield density frequency distribution. A histogram is a data structure that identifies (for a group of data values) a frequency of each data value in the group. In the current context, the group of data values is a group of Hounsfield unit values (e.g. of different pixels).

Each of the plurality of local histograms is representative of a different region of the at least one lung represented in the CT imaging data, as identified based on the results of the segmentation. The plurality of local histograms may correspond to one or more image planes perpendicular to the gravity direction, to reduce the effect of gravity on the variation in Hounsfield density within each local histogram.

In the case of three-dimensional imaging data, the plurality of local histograms may, for example, comprise ray-wise histograms in a lateral (x-) direction. In other words, a Hounsfield density frequency distribution may be established for a plurality of yz-points in a lateral view. Alternatively or additionally, the plurality of local histograms may comprise ray-wise histograms in an axial (z-) direction (i.e. a Hounsfield density frequency distribution may be established for a plurality of xy-points in an axial view).

In another example, the plurality of local histograms may comprise two-dimensional patch-wise histograms in a coronal (xz-) plane.

In some examples, the plurality of local histograms may each comprise a plurality of sub-local histograms. In other words, for each local histogram, a plurality of sub-local histograms, each representative of a subregion of the region of the at least one lung represented by the local histogram, may be generated. The sub-local histograms corresponding to a particular local histogram may then be cumulated to generate the local histogram.

The sub-local histograms may have a finest possible resolution. This allows local histograms of any desired resolution to be generated by cumulating the sub-local histograms.

For example, the sub-local histograms may comprise ray-wise histograms (e.g. in a lateral (x-) and/or axial (z-) direction). In another example, the sub-local histograms may comprise two-dimensional patch-wise histograms (e.g. in a coronal plane).

The number of sub-local histograms cumulated into one local histogram may be any number between one and N, where N is the total number of sub-local histograms across the at least one lung. In some examples, the number of sub-local histograms cumulated into a single local histogram may be a factor of N, so that each local histogram may comprise an equal number of sub-local histograms.

The number of sub-local histograms cumulated into one local histogram may be pre-determined, or may be determined based on a desired resolution, which may be obtained by user input.

Hounsfield density histograms are commonly used in processing CT imaging data, and methods for computing the plurality of local or sub-local histograms will be apparent to the skilled person. The computation may be carried out using a massively parallel processing approach.

Histograms are cumulated by combining the histograms; for example, histograms may be cumulated using a summing operation (e.g. a sum or a weighted sum of the histograms). Other methods for cumulating histograms will be apparent to the skilled person, e.g. using an averaging, a multiplication or weighted multiplication. In some examples, where the cumulating involves a weighted sum, Gaussian weighting may be applied when cumulating the sub-local histograms into the local histograms (e.g. using a standard three-dimensional Gaussian filtering, where the x-axis of the image volume is the axis of histogram bins). In other examples, other types of filtering or weighting (e.g. mean filtering, median filtering, etc.) may be applied when cumulating the sub-local histograms.

The processing system 130 then generates a global histogram of Hounsfield density frequency distribution for the at least one lung of the subject 110. The global histogram may be generated by cumulating the local histograms. The global histogram may be generated for a single lung or both lungs, or separate global histograms may be generated for each lung.

In some examples, the global histogram may be generated by first cumulating the local histograms into regional histograms, and then cumulating the regional histograms into the global histogram. The regional histograms may correspond to a plurality of neighborhoods extending in a direction perpendicular to a direction of the ray-wise histograms. In other words, ray-wise histograms corresponding to a position within a particular neighborhood may be cumulated into a regional histogram. For instance, ray-wise histograms in a lateral (x-) direction may be cumulated into regional histograms corresponding to yz-neighborhoods, and ray-wise histograms in an axial (i.e. cranio-caudal) (z-) direction may be cumulated into regional histograms corresponding to xy-neighborhoods.

For each of the plurality of local histograms, the processing system 130 generates a plurality of shifted local histograms and cross-correlates each shifted local histogram with the global histogram. Each of the plurality of shifted local histograms is a version of the local histogram shifted (along the Hounsfield density axis) by a different shift value. The shift values by which the local histogram is shifted may fall within a predetermined range. For example, the shift values may be in a range between −200 Hounsfield units and +200 Hounsfield units.

Cross-correlation is a well-known technique in the field of image processing for determining a similarity between two histograms, and provides a sensitive yet robust estimation of a goodness of fit. See, for example, Wu and Hudson, "An image-clustering method based on cross-correlation of color histograms", Proc. SPIE 5682, Storage and Retrieval Methods and Applications for Multimedia 2005, and Guthier et al., "Parallel implementation of a real-time high dynamic range video system", Integrated Computer-Aided Engineering, 21(2):189-202.

The cross-correlation of each of the plurality of shifted local histograms with the global histogram produces a respective plurality of correlation values. The processing system 130 then processes the shift values and correlation values to produce a final shift value for each of the plurality of local histograms.

The final shift value for a local histogram may, for example, be the shift value corresponding to the correlation value having the maximum value amongst the plurality of correlation values of the local histogram.

Alternatively, a correlation-weighted mean shift value may be used as the final shift value, in order to reduce the effect of noise and outliers. It is expected that the correlation value would increase approximately smoothly when approaching the "true" shift value corresponding to maximum correlation. The "true" peak shift value may therefore be estimated as the correlation-weighted mean shift even where the peak position is affected by noise. The correlation-weighted mean shift may be computed as:

$$s = \frac{\sum_i c_i s_i}{\sum_i c_i} \tag{1}$$

where $c_i$ is the correlation value produced at shift value $s_i$.

In some examples, the processing system 130 may be further configured to generate a visualization of the final shift values for the plurality of local histograms and output the generated visualization to the user interface 140. The pulmonary ventilation and perfusion gradient is more apparent in such a visualization compared with a visualization of Hounsfield densities, allowing a clinician to identify the presence and magnitude of the gravity-dependent gradient, and determine a treatment choice for the subject accordingly. The visualization of final shift values may also enable a clinician to identify areas in which the local gradient is not aligned with the direction of gravity, which may aid the diagnosis of certain lung diseases.

Any appropriate scale for representing the final shift values may be used in the visualization. In some examples, negative final shift values may be represented by a first color, and positive final shift values may be represented by a second, different color. A magnitude of the final shift values may be represented by an intensity of the first or second color.

In some examples, the visualization of the final shift values may overlay a visualization of maximum correlation values (or correlation-weighted mean shift values). For instance, the processing system 130 may generate a gray-scale visualization of the maximum correlation values for the plurality of local histograms, and generate a color overlay representative of the final shift values on the visualization of the maximum correlation values.

Local histograms corresponding to typical parenchyma regions will correlate highly with the global histogram at the shift value corresponding to a maximum correlation value, while diseased areas will generally have very low maximum correlation values.

By combining a visualization of the final shift values with a visualization of maximum correlation values, a "key image" may be generated, showing the regional presence, amount and distribution of the pulmonary ventilation and diffusion gradient alongside diseased parenchyma regions.

In some examples, where the CT imaging data 125 is three-dimensional imaging data, a three-dimensional visualization representative of a pulmonary ventilation and perfusion gradient may be generated. For instance, the processing system 130 may generate a first plurality of ray-wise histograms in a lateral (x-) direction and a second plurality of ray-wise histograms in an axial (z-) direction, and cross-correlate each of the histograms with a global histogram as described above to produce a three-dimensional visualization of final shift values.

A three-dimensional visualization may show local variations in the ventro-dorsal gravity effect that are not obvious from a two-dimensional visualization, particularly variations in a coronal (xz-) plane.

In other examples, a two-dimensional visualization in a coronal view may be generated in addition to a two-dimensional visualization in a lateral and/or axial view, so that variations in axial (z-) and lateral (x-) directions might be observed. This visualization may be generated as described above, using, for example, ray-wise histograms in an antero-posterior (y-) direction as the local histograms.

Figure 2:
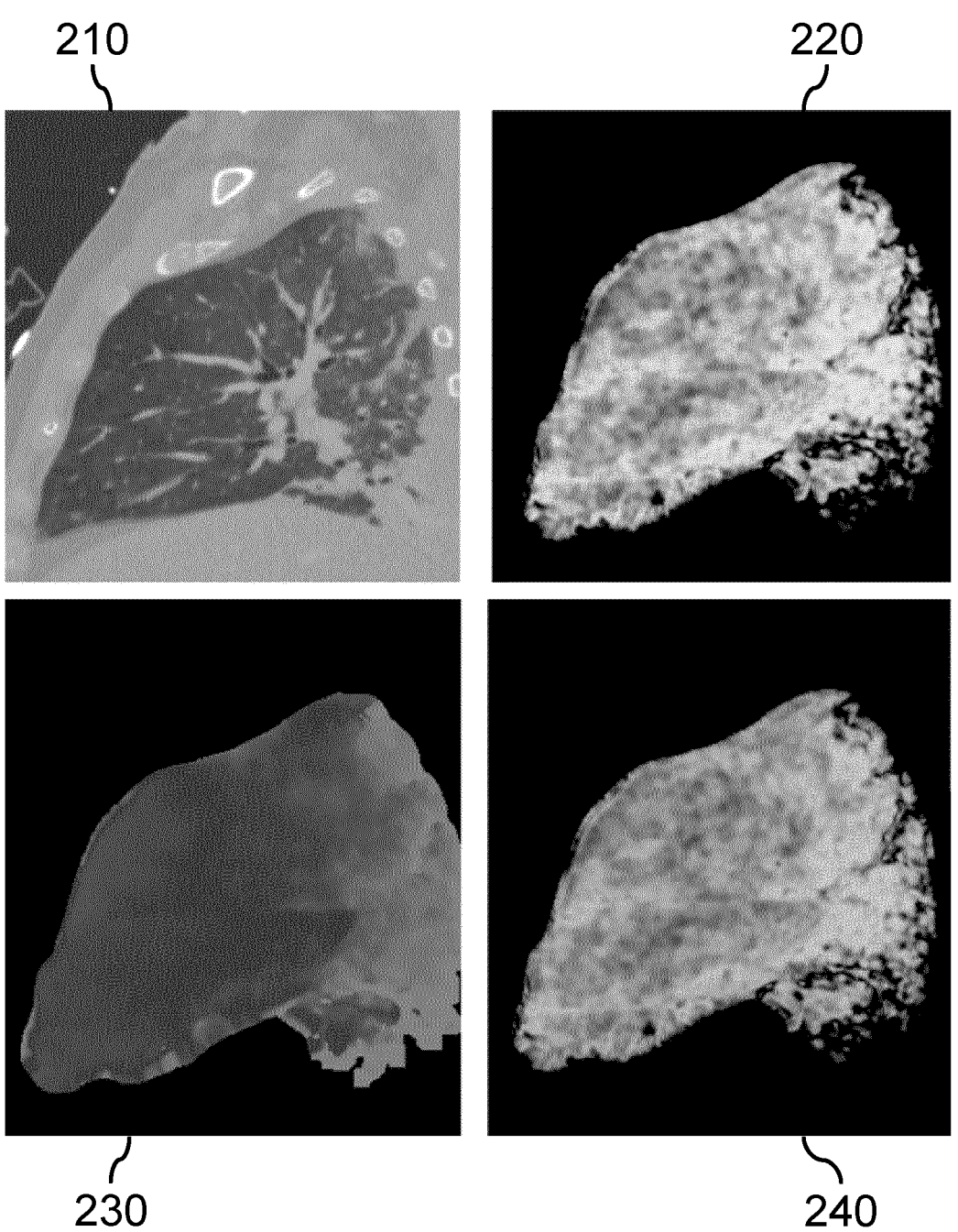
FIG. 2 illustrates example images generated from CT imaging data of a lung of a subject with COVID-19.

FIG. 2 illustrates example images generated from CT imaging data of a lung of a subject with COVID-19.

Image 210 illustrates standard Hounsfield values of a single slice in sagittal view.

Image 220 illustrates a visualization of maximum correlation values, generated by cross-correlating histograms as described above. In image 220, the local histograms used in the cross-correlation with the global histogram were generated by cumulating sub-local histograms comprising lateral ray-wise histograms, with a Gaussian weighted neighborhood radius of 9 pixels in the sagittal plane.

Image 230 illustrates a visualization of the shift values at which maximum cross-correlation was reached, with negative shifts represented by darker shading and positive shifts represented by lighter shading. In this visualization, the pulmonary ventilation and perfusion gradient can clearly be seen.

Image 240 illustrates a composite image of images 220 and 230, showing both the pulmonary ventilation and perfusion gradient and diseased areas of the lungs (in this case, dorsal COVID-19 lesions, which manifest as defects in the visualization of maximum correlation values). Image 240 is a gray-scale image; the pulmonary ventilation and perfusion gradient may be more easily distinguished from variations caused by disease by the use of color for one or both of the visualizations.

Figure 3:
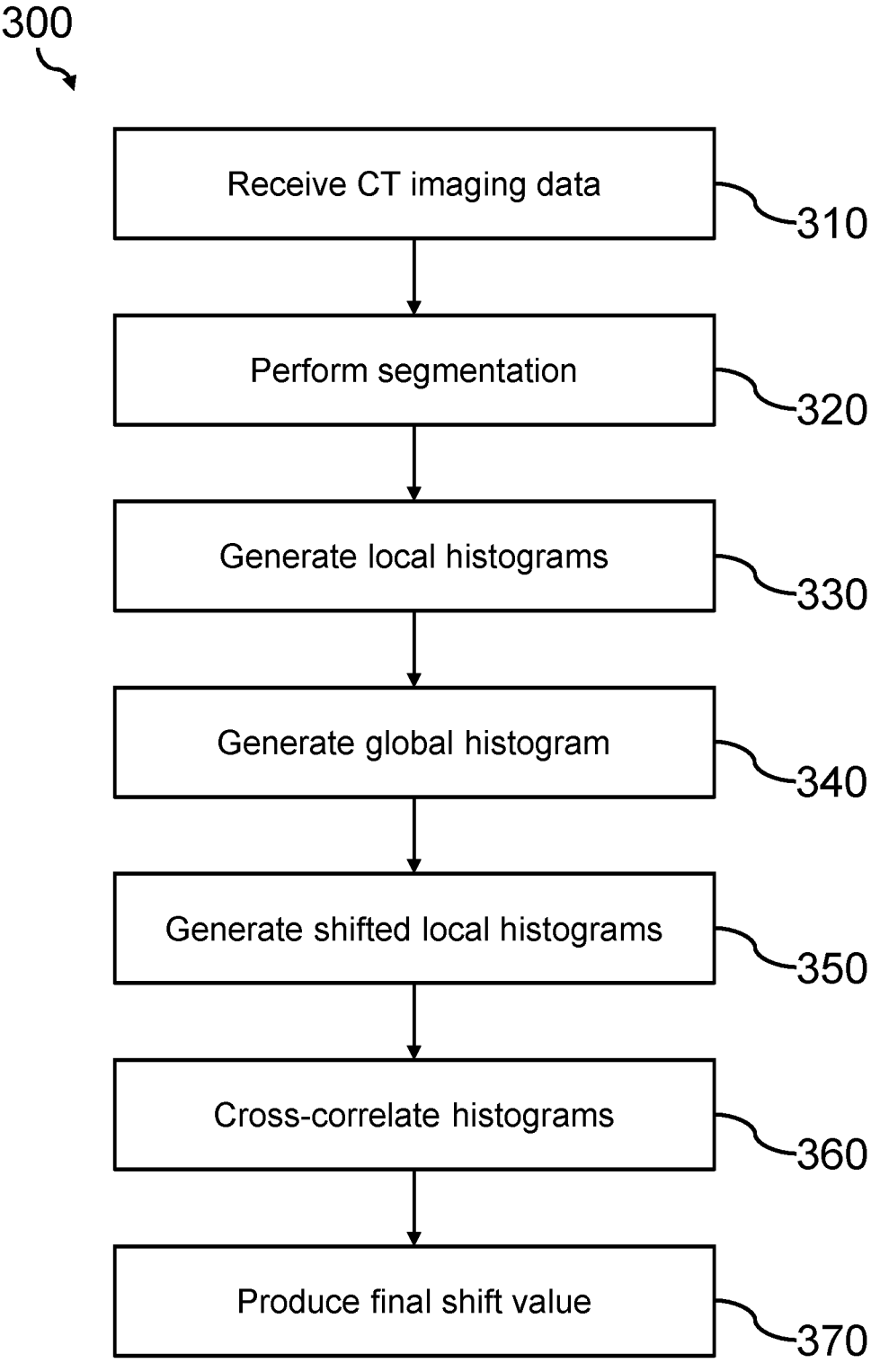
FIG. 3 illustrates a computer-implemented method for evaluating at least one lung of a subject, according to an embodiment of the invention.

FIG. 3 illustrates a computer-implemented method 300 for evaluating at least one lung of a subject, according to an embodiment of the invention.

The method begins at step 310, in which CT imaging data containing a representation of at least one lung of the subject is obtained.

At step 320, segmentation is performed on the CT imaging data to identify the representation of at least one lung of the subject.

At step 330, a plurality of local histograms of Hounsfield density frequency distribution is generated by processing the CT imaging data. Each of the plurality of local histograms is representative of a different region of the at least one lung represented in the CT imaging data.

At step 340, a global histogram of Hounsfield density frequency distribution for the at least one lung of the subject is generated.

At step 350, for each of the plurality of local histograms, a plurality of shifted local histograms is generated. Each shifted local histogram is a version of the local histogram shifted by a different shift value.

At step 360, for each of the plurality of local histograms, each shifted local histogram is cross-correlated with the global histogram to produce a respective plurality of correlation values.

At step 370, for each of the plurality of local histograms, the shift values and the correlation values are processed to produce a final shift value.

It will be understood that the disclosed methods are computer-implemented methods. As such, there is also proposed a concept of a computer program comprising code means for implementing any described method when said program is run on a processing system.

As described above, the system makes use of a processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A processing system for evaluating a pulmonary ventilation and perfusion gradient of at least one lung of a subject, comprising:
   a memory that stores a plurality of instructions; and
   a processor coupled to the memory and configured to execute the plurality of instructions to:
      receive computed tomography (CT) imaging data containing a representation of at least one lung of the subject;
      perform segmentation on the CT imaging data to identify the representation of at least one lung of the subject;
      generate a plurality of local histograms of Hounsfield density frequency distribution by processing the CT imaging data, wherein each of the plurality of local histograms is representative of a different region of the at least one lung represented in the CT imaging data;
      generate a global histogram of Hounsfield density frequency distribution for the at least one lung of the subject; and
      for each of the plurality of local histograms:
         generate a plurality of shifted local histograms, each shifted local histogram being a version of the local histogram shifted by different shift value;
         cross-correlate each shifted local histogram with the global histogram to produce a respective plurality of correlation values; and process the shift values and the correlation values to produce a final shift value,
      wherein an overall range in magnitudes of the final shift values is representative of a magnitude of the pulmonary ventilation and perfusion gradient.

2. The processing system of claim 1, wherein the final shift value for each of the plurality of local histograms is the shift value corresponding to the correlation value having the maximum value amongst the plurality of correlation values of the local histogram.

3. The processing system of claim 1, wherein the final shift value for each of the plurality of local histograms is a correlation-weighted mean shift value.

4. The processing system of claim 1, further comprising a user interface, wherein a visualization of the final shift values is provided.

5. The processing system of claim 4, wherein negative final shift values are represented by a first color, and positive final shift values are represented by a second, different color.

6. The processing system of claim 4, wherein the visualization of the final shift values is generated by:
   generating, for each local histogram, a visualization of the maximum correlation values for that local histogram; and
   generating an overlay representative of the final shift values on the visualization of the maximum correlation values.

7. The processing system of claim 1, wherein shift values are in a predetermined range.

8. The processing system of claim 1, wherein the plurality of local histograms comprise ray-wise histograms in a lateral direction and/or an axial direction.

9. The processing system of claim 1, wherein the plurality of local histograms comprise two-dimensional patch-wise histograms in a coronal plane.

10. The processing system of claim 1, wherein each of the plurality of local histograms is generated by:
   generating a plurality of sub-local histograms, wherein each of the sub-local histograms is representative of a different subregion of the region of the at least one lung corresponding to the local histogram; and
   cumulating the sub-local histograms into the local histogram.

11. The processing system of claim 1, wherein the global histogram is generated by cumulating the local histograms into the global histogram.

12. A computer-implemented method for evaluating a pulmonary ventilation and perfusion gradient of at least one lung of a subject, the computer-implemented method comprising:
   receiving computed tomography (CT) imaging data containing a representation of at least one lung of the subject;
   performing segmentation on the CT imaging data to identify the representation of at least one lung of the subject;
   generating a plurality of local histograms of Hounsfield density frequency distribution by processing the CT imaging data, wherein each of the plurality of local histograms is representative of a different region of the at least one lung represented in the CT imaging data;
   generating a global histogram of Hounsfield density frequency distribution for the at least one lung of the subject; and
   for each of the plurality of local histograms:

generating a plurality of shifted local histograms, each shifted local histogram being a version of the local histogram shifted by different shift value;

cross-correlating each shifted local histogram with the global histogram to produce a respective plurality of correlation values; and processing the shift values and the correlation values to produce a final shift value, wherein an overall range in magnitudes of the final shift values is representative of a magnitude of the pulmonary ventilation and perfusion gradient.

13. A non-transitory computer-readable medium for storing executable instructions, which cause a method to be performed for evaluating a pulmonary ventilation and perfusion gradient of at least one lung of a subject, the method comprising:

receiving computed tomography (CT) imaging data containing a representation of at least one lung of the subject;

performing segmentation on the CT imaging data to identify the representation of at least one lung of the subject;

generating a plurality of local histograms of Hounsfield density frequency distribution by processing the CT imaging data, wherein each of the plurality of local histograms is representative of a different region of the at least one lung represented in the CT imaging data;

generating a global histogram of Hounsfield density frequency distribution for the at least one lung of the subject; and for each of the plurality of local histograms:

generating a plurality of shifted local histograms, each shifted local histogram being a version of the local histogram shifted by different shift value;

cross-correlating each shifted local histogram with the global histogram to produce a respective plurality of correlation values; and processing the shift values and the correlation values to produce a final shift value, wherein an overall range in magnitudes of the final shift values is representative of a magnitude of the pulmonary ventilation and perfusion gradient.

* * * * *